ð(12) United States Patent
Yajima

(10) Patent No.: US 6,903,846 B2
(45) Date of Patent: Jun. 7, 2005

(54) IMAGE READING DEVICE HAVING INPUTS RESPECTIVELY ASSOCIATED WITH DIFFERENT MODES OF USE OF READ IMAGE DATA AND MULTI-FUNCTIONAL IMAGE FORMING APPARATUS FOR USE THEREWITH

(75) Inventor: Shunsuke Yajima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 717 days.

(21) Appl. No.: 09/879,304

(22) Filed: Jun. 12, 2001

(65) Prior Publication Data

US 2003/0095295 A1 May 22, 2003

(30) Foreign Application Priority Data

Jun. 12, 2000 (JP) .......................... 2000-175615

(51) Int. Cl.[7] .................................. H04N 1/04
(52) U.S. Cl. .................. 358/401; 358/296; 358/1.15; 399/374; 355/202
(58) Field of Search ............................ 358/401, 498, 358/474, 400; 399/374, 85, 7, 1, 82; 355/202; 271/209, 171, 3.03

(56) References Cited

U.S. PATENT DOCUMENTS

| 4,508,447 A | * | 4/1985 | Doery | ........................ 399/374 |
| 5,532,839 A | * | 7/1996 | Beikirch et al. | ............ 358/401 |
| 5,534,973 A | | 7/1996 | Harada | ........................ 355/202 |

FOREIGN PATENT DOCUMENTS

| JP | 05-310341 | 11/1993 | |
| JP | 6276350 | 9/1994 | ............ H04N/1/00 |
| JP | 10-190918 | 7/1998 | |

* cited by examiner

Primary Examiner—Edward Coles
Assistant Examiner—Heather D. Gibbs
(74) Attorney, Agent, or Firm—David G. Conlin; David A. Tucker; Edwards & Angell, LLP

(57) ABSTRACT

An image reading device and an image forming apparatus including the device, include: a multiple number of document trays; a control panel through which each of the multiple document trays can be designated to be used as a dedicated tray for a usage mode and which can provide the condition display corresponding to each of the usage modes; and a controller which, when a document or documents are placed on one of the dedicated trays, automatically presents on the control panel the condition display for the usage mode of the dedicated tray.

10 Claims, 11 Drawing Sheets

FIG. 10

Management Table

| The 1st tray setting | The 2nd tray setting |
|---|---|
| Copier | Fax |
| Copier | Fax |
| Fax | Fax |
| Copier | Copier |
| Copier | Copier |
| Fax | Fax |

CT2

IMAGE READING DEVICE HAVING INPUTS RESPECTIVELY ASSOCIATED WITH DIFFERENT MODES OF USE OF READ IMAGE DATA AND MULTI-FUNCTIONAL IMAGE FORMING APPARATUS FOR USE THEREWITH

BACKGROUND OF THE INVENTION (1) Field of the Invention

The present invention relates to an image reading device for reading image information from originals and an image forming apparatus equipped with the image reading device, in particular, relating to an image reading device with a multiple number of document trays and a multi-functional digital image forming apparatus having copier, facsimile and other functions.

(2) Description of the Prior Art

Conventionally, there have been developed multi-functional digital image forming apparatus which can implement multiple functions such as copier and facsimile functions. In such an image forming apparatus, image information need to be read from originals in either of the copier and facsimile functions. Therefore, recently, image reading devices equipped with an automatic document feeder have been often used in order to make the reading operation smooth and efficient.

As an example of technology relating to the image reading device as above, Japanese Patent Application Laid-Open Hei 6 No. 276350 can be mentioned. This technical publication discloses an automatic document feeder having a multiple number of document trays corresponding to copier and facsimile functions, respectively, so as to selectively perform copying operation of documents and facsimile transmission of documents depending upon the operational status.

However, the above prior art, i.e., the multi-functional image forming apparatus is mainly aimed at avoiding mis-operations along with implementation of the copier or facsimile function, so only presents a limited improvement in operativity as a multi-functional machine including an image reading device.

Since, in typical or most multi-functional machines, the originals to be read during copier reading document have been adapted to be set facing in a reverse direction to that for facsimile, mis-operations would be liable to often occur if the machine has only one document tray. In order to avoid this problem, a separate document tray is provided for each function.

In the above art, however, since the operation of the multi-functional machine is automatically selected after detecting whether each document tray has documents thereon, the user's wish cannot be sufficiently satisfied when documents are scanned.

There is no reference or consideration of the point whereby the conditions for each document tray may be set or modified taking the advantage of multiple document trays and the operational control of the machine may be adapted to be designated based on the conditions.

SUMMARY OF THE INVENTION

The present invention has been devised in view of the above problems, it is therefore an object of the present invention to provide an image reading device and a multi-functional image forming apparatus equipped with the image reading device, which has a multiple number of modes (functions) and includes an automatic document feeder with a multiple number of document trays corresponding to the modes and which is improved in the operativity of the document reading operation by properly handling the user's requests.

In order to achieve the above object, the present invention is configured as follows:

The first aspect of the present invention resides in an image reading device which allows the read image information from a document to be used for multiple usage purposes, comprising: an image reading portion for reading image information from the document; a document feeder portion for feeding and conveying the document to the image reading portion; a multiple number of document trays for feeding documents to the document feeder portion; a control portion through which each of the multiple number of document trays can be designated to be used as a dedicated tray corresponding to the usage purpose and which can provide the presentation of operational conditions corresponding to the usage purpose; and a controller which, when the document is placed on one of the dedicated trays, automatically selects among the multiple sets of operational conditions, one set of operational conditions for the usage purpose designated for the document-placed, dedicated tray and presents the one set of operational conditions on the control portion.

According to the first aspect of the present invention, since a multiple number of document trays are provided in correspondence with multiple number of usage purposes (e.g., modes in the image forming apparatus such as copier mode, facsimile mode, etc.) of image information, each of the document trays can be used as the tray dedicated for a single usage purpose. Therefore, the user is able to perform a desired process by only selecting one tray corresponding to the purpose and placing the document on that tray.

The second aspect of the present invention resides in the image reading device having the above first aspect wherein the control portion includes a display portion and the presentation of the operational conditions is displayed on the display portion.

According to the second aspect of the present invention, the control portion becomes automatically set into the indication state corresponding to the usage purpose (mode). For example, if the control portion has a display portion, the display portion displays the display frame corresponding to the usage purpose. As a result, it is possible to improve the operativity of the image reading device and the image forming apparatus having the device, for example.

The third aspect of the present invention resides in the image reading device having the above first or second aspect, wherein the control portion comprises a condition setting portion, through which the multiple document trays are allotted to individual dedicated trays each corresponding to a different usage purpose.

According to the third aspect of the present invention, the condition setting portion permits arbitrary setting of the mode (conditions) for each document tray. Therefore, it is possible to provide more user-friendly control environment of the document trays in accordance with the usage environment of the multi-functional image forming apparatus having this image reading device.

The fourth aspect of the present invention resides in the image reading device having the above first or second aspect, wherein the control portion has a usage purpose selector for allowing a dedicated tray to be temporarily used for a usage purpose other than that designated even after when the document has been placed on the dedicated tray.

According to the fourth aspect of the present invention, if the document tray currently selected is not designated for the usage purpose (mode) desired by the user, the operational state can be changed into that corresponding to the other usage purpose (mode) by means of the usage purpose selector in the control portion.

The fifth aspect of the present invention resides in the image reading device having the above first or second aspect, wherein setup of the dedicated trays or designation of the usage purposes to the multiple document trays is made by the controller managing and analyzing the usage purposes of pieces of image information which have been read over a certain period of time.

According to the fifth aspect of the present invention, for example, depending on the installation environment of the multi-functional machine having the image processing device of the present invention, the operational conditions of the document trays can be automatically set up in a user-friendly manner.

The sixth aspect of the present invention resides in the image reading device having the above first or second aspect, wherein, when documents are placed on multiple dedicated trays, the controller keeps the presentation of the operating conditions for a first dedicated tray on which a document was placed first unchanged until input of the operational conditions for the first dedicated tray is completed.

According to the sixth aspect of the present invention, it is possible to process multiple sets of documents efficiently without being confused by the instructions for image reading operation for the first set of documents and the instructions for image reading operation for the subsequent set of documents.

The seventh aspect of the present invention resides in the image reading device having the above first or second aspect, wherein, when documents are placed on multiple dedicated trays, after the document reading operation for a first dedicated tray on which documents were placed starts, the presentation of the operating conditions for a second dedicated tray on which document was placed subsequently is given.

According to the seventh aspect of the present invention, job control instructions for a subsequently set documents can be smoothly input so that it is possible to effect the command of the subsequent job. Further, it is possible to process multiple sets of documents efficiently without being confused by the instructions input for the documents under reading and the instructions input for the documents set subsequently.

The eighth aspect of the present invention resides in the image reading device having the above first or second aspect, wherein, when no document is placed on any of the dedicated trays, multiple sets of operational conditions are displayed in the control portion and when the document is placed on a dedicated tray, the controller automatically presents one set of the operating conditions for the usage purpose of the document-placed, dedicated tray.

According to the eighth aspect of the present invention, since multiple sets of operational conditions are presented before placement of documents, the user is able to know the usage purposes operable in the image reading device. Further, since only placement of documents on one of the dedicated trays makes it possible to present the set of the operating conditions for the usage purpose of the selected tray, the user can easily grasps the usage purpose and presented conditions.

The ninth aspect of the present invention resides in the image reading device having the above first or second aspect, wherein the usage purposes of image information at least include: image formation usage on a recording medium and transmission usage.

According to the ninth aspect of the present invention, image formation and transmission of image information can be carried out efficiently.

The tenth aspect of the present invention resides in the image forming apparatus comprising an image reading device having any one of the preceding aspects.

According to the tenth aspect of the present invention, since the image forming apparatus includes an image reading device according to the above the first or second aspect, it is possible to efficiently read multiple sets of documents.

The eleventh aspect of the present invention resides in an image forming apparatus which allows the read image information from a document to be used for multiple usage purposes, comprising: an image forming portion for forming image on recording media in accordance with the image information; a transmitter for transmitting the image information; an image reading portion for reading image information from the document; a document feeder portion for feeding and conveying the document to the image reading portion; a multiple number of document trays for feeding the document to the document feeder portion; a control portion through which each of the multiple number of document trays can be designated to be used as the dedicated tray for image formation or that for transmission and which can provide the presentation of the operational conditions for image formation and that of the operational conditions of transmission; and a controller which, when the document is placed on one of the dedicated trays, automatically selects from sets of operational conditions for image formation and transmission, one set of operational conditions corresponding to the document-placed, dedicated tray and presents the set of operational conditions on the control portion.

According to the eleventh aspect of the present invention, since in a typical multi-functional image forming apparatus at least including both the copier and facsimile functions, one dedicated tray is set for each of the image forming and fax transmitting functions, it is possible to perform each function more efficiently.

BRIEF DESCRIPTION OF THE DRAWINGS

FIG. 10 is a block diagram showing a management table according to the embodiment of the present invention;

DESCRIPTION OF THE PREFERRED EMBODIMENTS

The embodiment of the present invention will hereinafter be described in detail with reference to the accompanying drawings.

Figure 1:
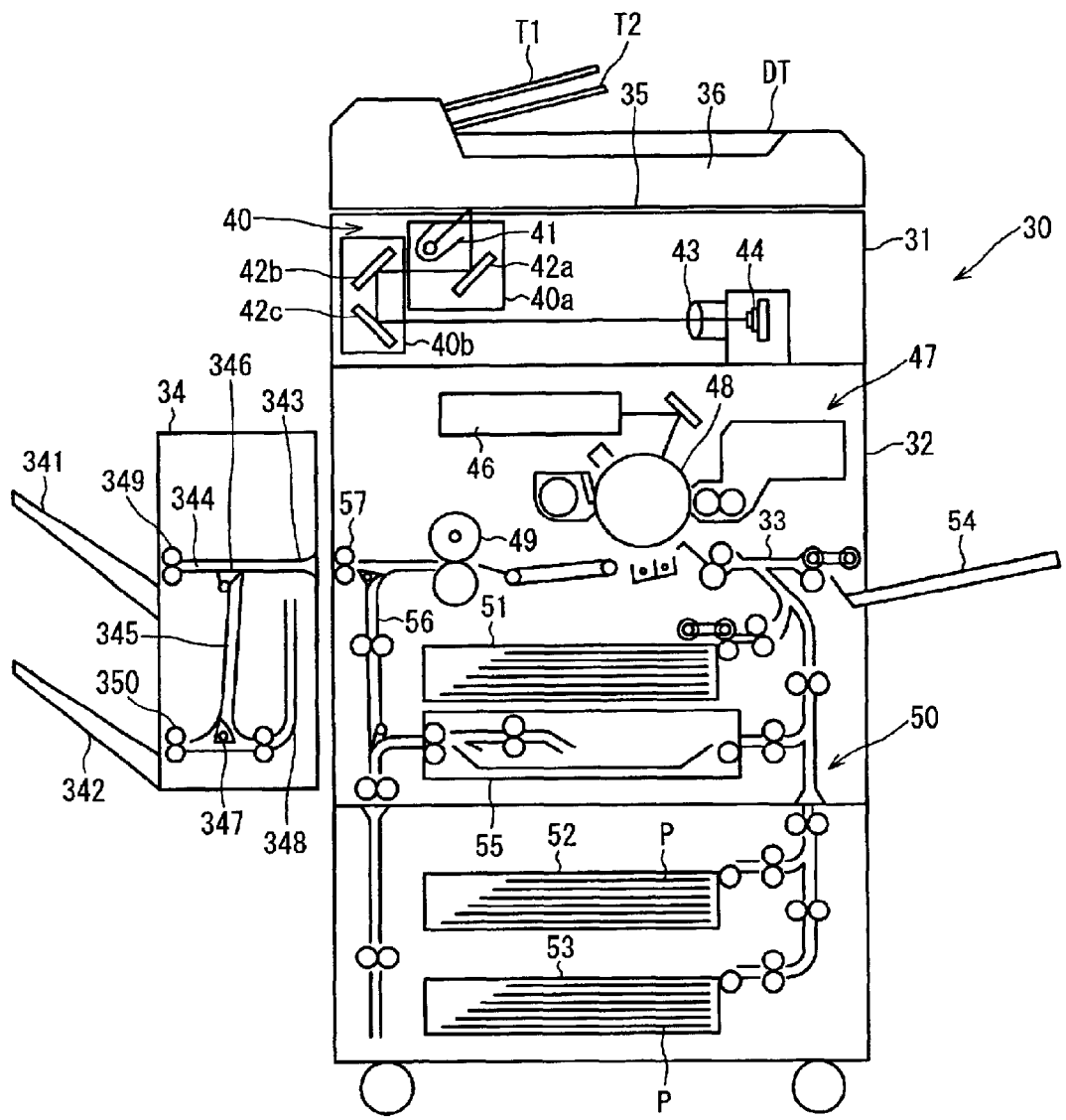
FIG. 1 is an illustrative view showing an image forming apparatus including an image reading device according to the embodiment of the present invention.

Referring first to FIG. 1, the configuration of an image forming apparatus with an image reading device according to the present embodiment will be described.

This imaging apparatus is a digital copier 30, which is mainly composed of a scanner portion (image reading device) 31 and a laser printer portion (image forming portion) 32. Though not illustrated, this image forming apparatus also includes a control portion through which conditions and instructions for image forming operations are input and a controller for controlling the operation of the whole machine.

Scanner portion 31 comprises an original table 35 made up of transparent glass; an automatic document feeder (ADF) 36 automatically feeding originals to original table 35, two document trays provided for the ADF 36 and a scanner unit (image reading portion) 40 or original image reading unit for scanning the image of an original placed on original table 35 to capture the original image. The operation of image reading by this scanner portion 31 will be detailed later.

The original image captured by this scanner portion 31 is sent as image data to an image data input portion, so that the image data is subjected to predetermined processes.

ADF 36, in order to enable scanner unit to read one side or both sides of the original document in accordance with the operator's choice, comprises a sheet feed path for single-sided originals, a sheet feed path for double-sided originals, a feed path switching mechanism, a group of sensors for monitoring and controlling the state of originals passing through different sites, a controller and the like.

Scanner unit 40 constituting scanner portion 31 for reading the image of the original placed on original table 35 comprises a lamp reflector assembly 41 for radiating the original surface with light, a first scan unit 40a having a first reflective mirror 42a reflecting the light reflected from the original to a photoelectric converting device (CCD), a second scan unit 40b having second and third reflective mirrors 42b and 42c for guiding the light reflected from the first scan unit 40a to the photoelectric converting device (CCD), an optical lens 43 for focusing the reflected light from the original passing through the above reflective mirrors, onto the device (CCD) for converting the light into an electric image signal, a CCD 44 already mentioned for converting the reflected image from the original into an electric image signal.

Scanner portion 31 is configured to pick up original images by moving scanner unit 40 along the underside of original table 35 whilst successively placing the originals to be read, on original table 35 by the associated operation of ADF 36 and scanner unit 40.

Specifically, the scan is controlled in such a manner that first scan unit 40a moves at a constant velocity V from the left to the right along the original table while second scan unit 40b moves at half the rate of the velocity V, i.e., V/2, in parallel in the same direction.

Thus, the image of the original placed on original table 35 is focused line by line onto CCD 44 and read thereby.

The image data thus obtained by reading the original image through scanner unit 40, is transferred to the image processor to be described later, where various processes are performed. Then, the data is temporarily stored into the memory in the image processor. The image data stored in the memory is loaded in accordance with the output instructions and transferred to a laser printer portion 32 where the image is produced on the sheet for recording.

This laser printer portion 32 comprises a conveying system for conveying sheets as the recording material on which the image is formed, a laser writing unit 46 and an electrophotographic processing unit 47 for forming images.

Laser writing unit 46 comprises a semiconductor laser beam source for emitting laser beams in accordance with the image data which has been captured in the memory by scanner unit 40 and is loaded therefrom, or in accordance with the image data transferred from an external apparatus, a polygonal mirror for deflecting the laser beam at an equi-angular velocity, and an f-theta lens for correcting the laser beam deflected at an equi-angular velocity so that the laser beam having passed therethrough scans at a constant velocity the photosensitive drum constituting electrophotographic process unit 47.

Electrophotographic processing unit 47, as is well known, includes a charger, developing device, transfer device, separator, cleaning unit and charge erasing unit, all provided around the photosensitive drum.

The sheet conveying system comprises: a sheet conveyer portion 33 for conveying a sheet P to the aforementioned electrophotographic processing unit for image forming, specifically, the transfer station where the transfer device is arranged; cassette paper feeders 51, 52 and 53 for feeding sheet P to the aforementioned sheet conveyer portion 33; a manual paper feeder 54 for allowing a sheet of a necessary size to be fed as appropriate; fixing unit 49 for fixing the toner image or the image formed on sheet P after transfer; and a re-feeding path 55 for re-feeding sheet P in order to form an image on the rear side of sheet P with an image fixed on one side thereof.

Provided on the downstream side of fixing unit 49 is a post-processing unit for receiving the sheet P after image recording and subjecting it to designated processes.

By the functions of laser writing unit 46 and electrophotographic processing portion 47, the image data loaded from the image memory is supplied to laser writing unit 46 so that the laser writing unit 46 scans the photosensitive drum with the laser beam to form a static latent image on the surface of the photosensitive drum 48. Then, the latent image is visualized with toner, and the toner image is electrostatically transferred and fixed onto the surface of the paper which has been fed from one of the paper feeders in the multi-paper feeder unit.

The paper with an image thus formed thereon is conveyed from fixing unit 49 via a discharging roller 57 into post-processing unit 34.

Next, the operation of scanner portion 31 as the image reading device according to the present invention will be described.

At least two document trays(the first document tray T1 and the second document tray T2) are provided above the ADF 36. A multiple number of documents are set on each of these trays so that the originals are automatically fed sheet by sheet onto original table 35 of scanner unit 40. The document fed on original table 35 is read as image data by scanner unit 40 and discharged onto a discharge tray DT.

Figure 2:
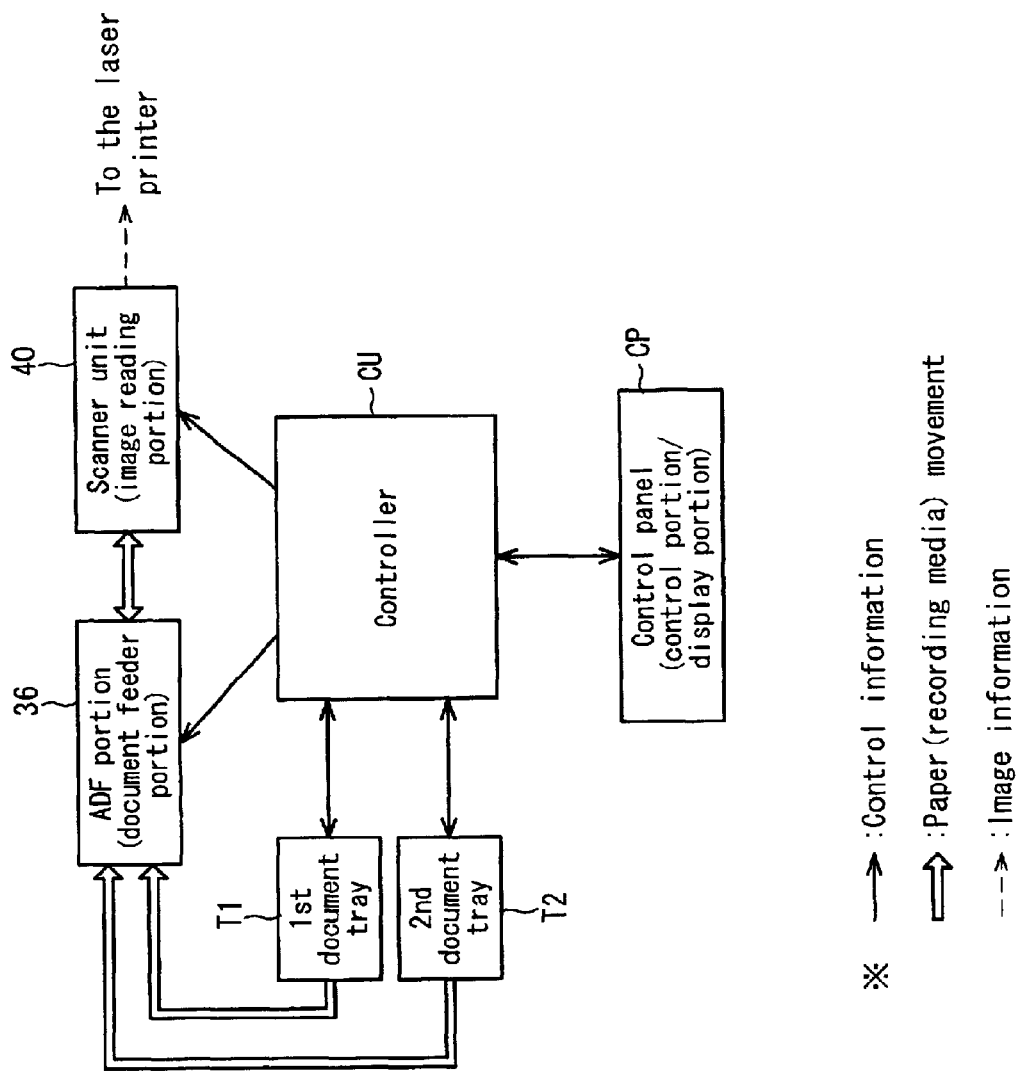
FIG. 2 is a block diagram operatively showing peripheral devices controlled by the controller according to the embodiment of the present invention.
Figure 3:
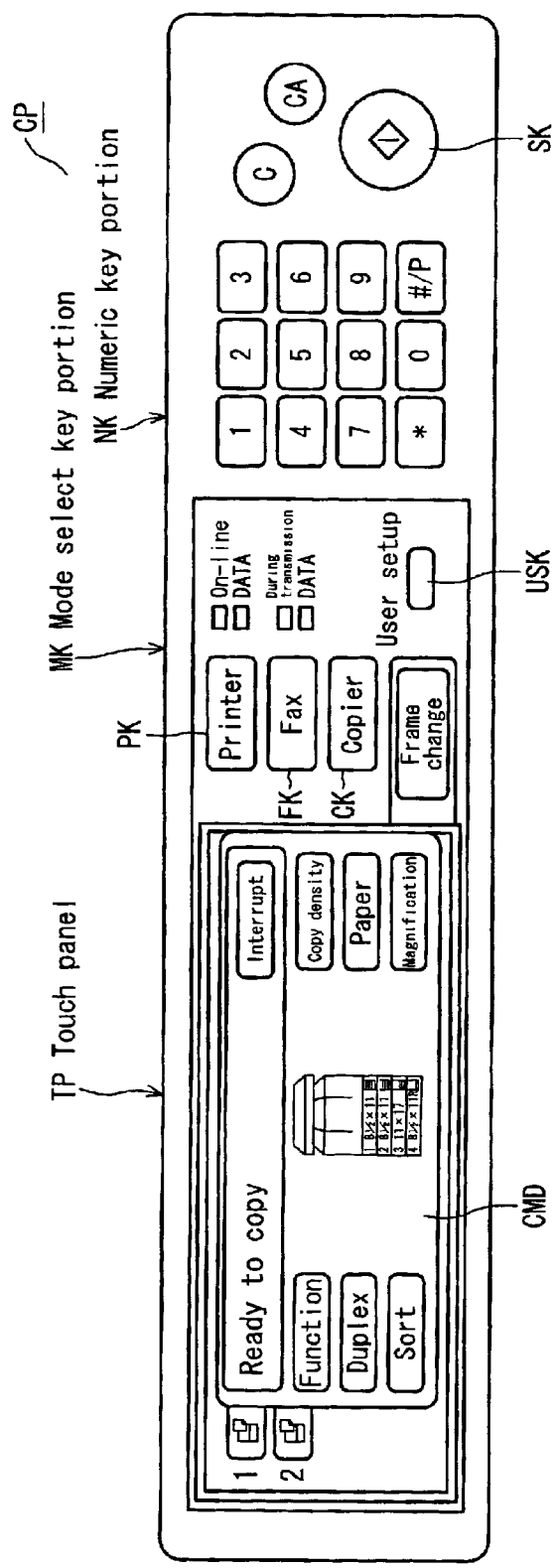
FIG. 3 is a front view showing a control panel according to the embodiment of the present invention.

ADF 36, scanner unit 40 and first and second document trays T1 and T2 as the constituents of the scanner portion 31 are controlled by a controller CU as shown in FIG. 2 and set up and commanded through a control panel CP. Control panel CP is composed of, for example, a numeric key portion NK, mode select key portion MK, touch panel TP (also functioning as a display portion), as shown in FIG. 3.

The image reading device according to this embodiment is used by a multifunctional image forming apparatus having three functional modes, i.e., copier, facsimile and printer modes. Therefore, the image information captured through the image reading device will be used for either of two purposes, that is, for the copier function (aimed at forming images on a recording medium such as paper) or facsimile transmission (aimed at transmission). Touch panel TP displays for what purpose (in which mode) the machine can be operated at present. That is, the operational conditions in a designated mode (options, e.g., copy density, paper, magnification, functions, dual-copy, sort, etc.) are displayed. In FIG. 3, the display content CMD for copier mode is shown.

The first and second document trays T1 and T2 can be set as the dedicated trays corresponding to the above modes by inputting predetermined conditions through control panel CP. Specifically, as an example of such setting, the first document tray T1 may be set as the dedicated tray for copier mode and the second document tray T2 may be set as the dedicated tray for facsimile mode.

Figure 4:
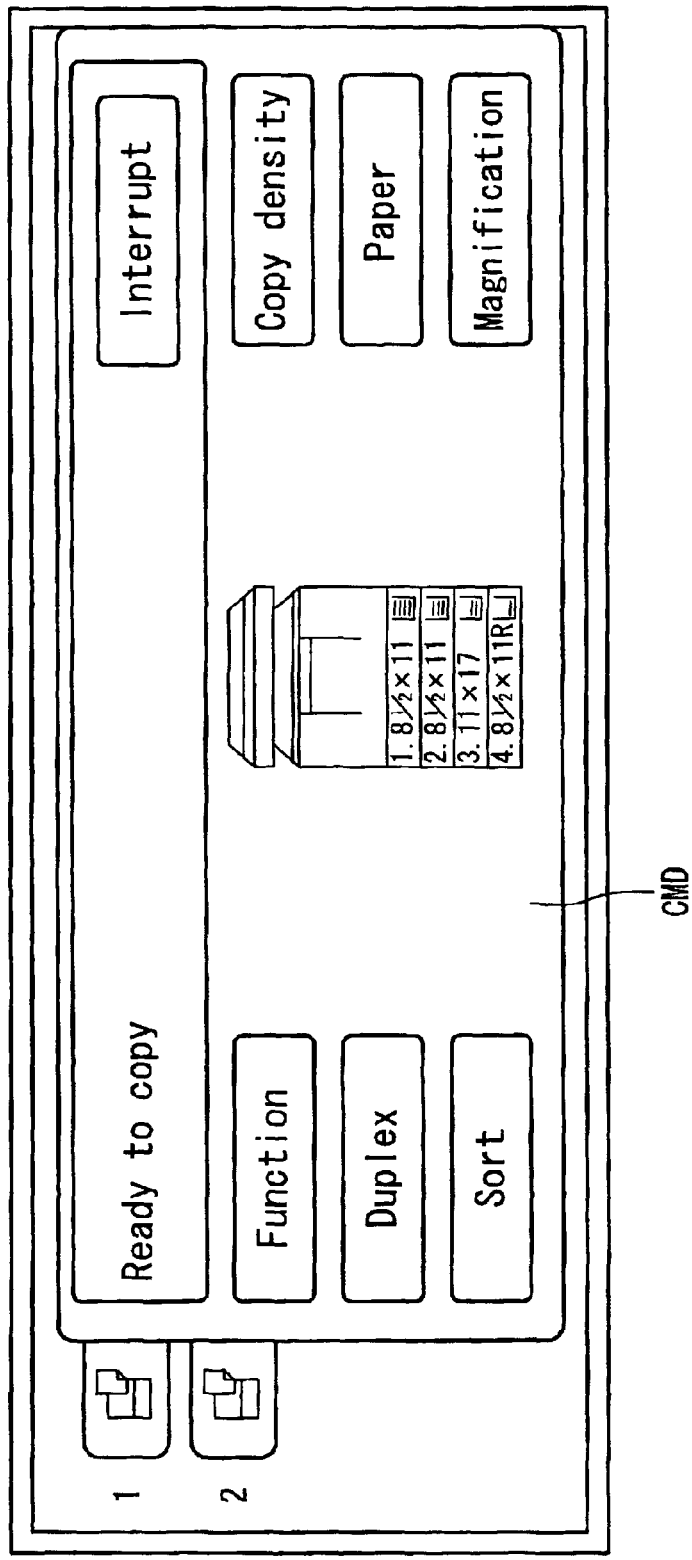
FIG. 4 is a front view showing a copier main display frame being displayed on a touch panel according to the embodiment of the present invention.
Figure 5:
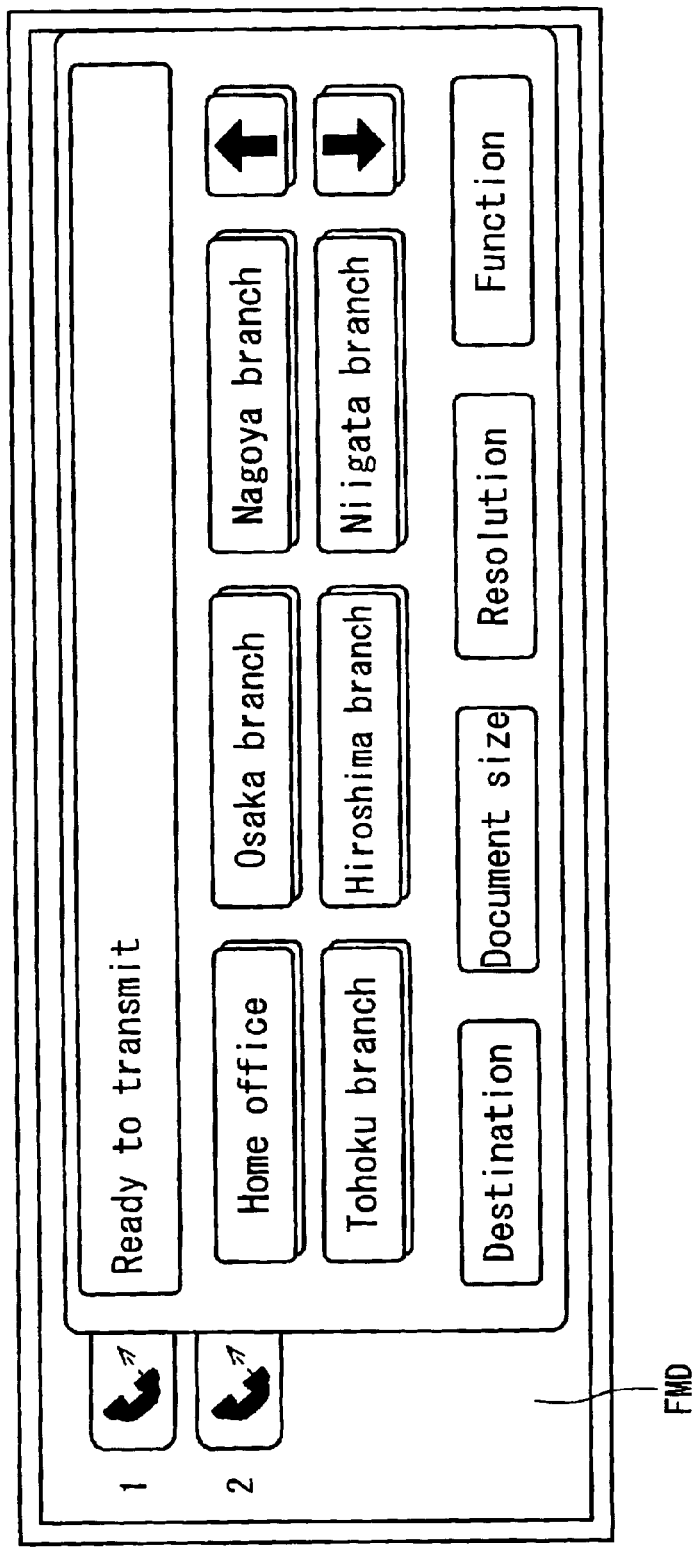
FIG. 5 is a front view showing a facsimile main display frame being displayed on a touch panel according to the embodiment of the present invention.

Further, controller CU performs control such that when a document or documents to be copied are placed on the first document tray T1 (dedicated for copier mode), the copier mode display CMD (c.f. FIGS. 3 and 4) will automatically appear on touch panel TP. Similarly, controller CU performs control such that when a document or documents to be faxed are placed on the second document tray T2 (dedicated for facsimile mode), the facsimile mode display FMD (c.f. FIG. 5: options as the operational conditions are, for example, destination, document size, resolution, functions, etc.) will appear on touch panel TP.

In this way, when a document is set on a dedicated tray, an unillustrated document detection sensor, e.g., photoelectric sensor or mechanical sensor, detects the presence of the document, controller CU, based on the detected result, controls the control panel CP to automatically change its display into the display content (operational conditions) in association with the set mode for the dedicated tray.

Figure 6:
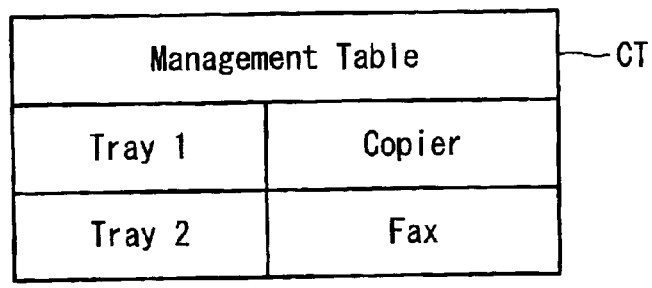
FIG. 6 is a block diagram showing a management table according to the embodiment of the present invention.
Figure 7:
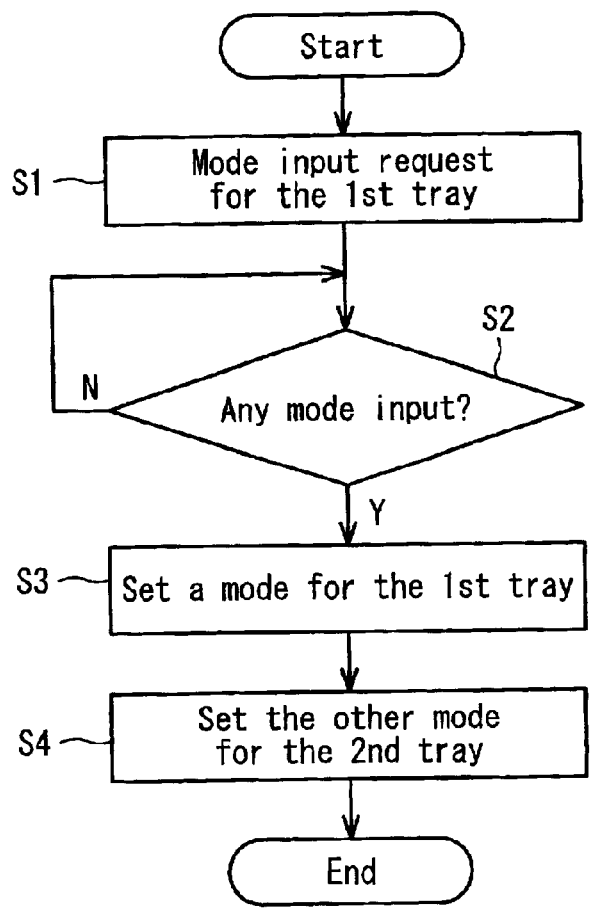
FIG. 7 is a flowchart for illustrating mode setting change in an image forming apparatus according to the embodiment of the present invention.

Here, the mode select key portion MK provided on control panel CP shown in FIG. 3 functions as the condition selector for each document tray. For example, as shown in management table CT in FIG. 6, suppose that the first document tray T1 has been designated as the dedicated tray for copier mode and the second document tray T2 has been designated as the dedicated tray for facsimile mode. Here, if the modes of the document trays need to be changed, the user select key USK (see FIG. 3) in the mode select key portion MK is pressed as shown in the flowchart of FIG. 7, so that an input request for the mode to be set for the first document tray T1 is made at Step (to be abbreviated as 'S') 1. Then at S2, it is judged whether a mode input is made through control panel CP.

For example, since at present the mode for the first document tray T1 has been set for copy mode, it is judged whether the facsimile mode key FK is pressed. If a mode input has been made, the mode (the facsimile mode in this example) is set up for the first document tray T1 at S3. Further, in this example, since there are only two modes, namely copier mode and facsimile mode as the sets of operational conditions for the document trays, if the mode for the first document tray T1 is determined, the other mode (copier mode) is automatically set for the document tray T2 at S4. Here, if there are more than two modes of operation, the sequence from S1 to S3 should be repeated.

Further, even when a document or documents to be scanned in a first mode are set on a tray dedicated to other than that mode, the above control panel CP allows the operator to instruct the image reading operation in the second mode to be performed.

For example, since the first and second document trays T1 and T2 are arranged above and below each other, the first document tray T1 at the top is easy to use. In this arrangement, there may be a case where documents for facsimile are preferably set on the first document tray T1 which has been set as the dedicated tray for copier mode so as to perform a facsimile operation.

In this embodiment, instead of the operation of the user select key, pressing only the necessary mode switching key (printer PK, facsimile FK or copier CK) makes it possible to change the operational conditions of the first document tray T1 and enables the tray for facsimile mode. This can further improve the usefulness of the image reading device.

Figure 8:
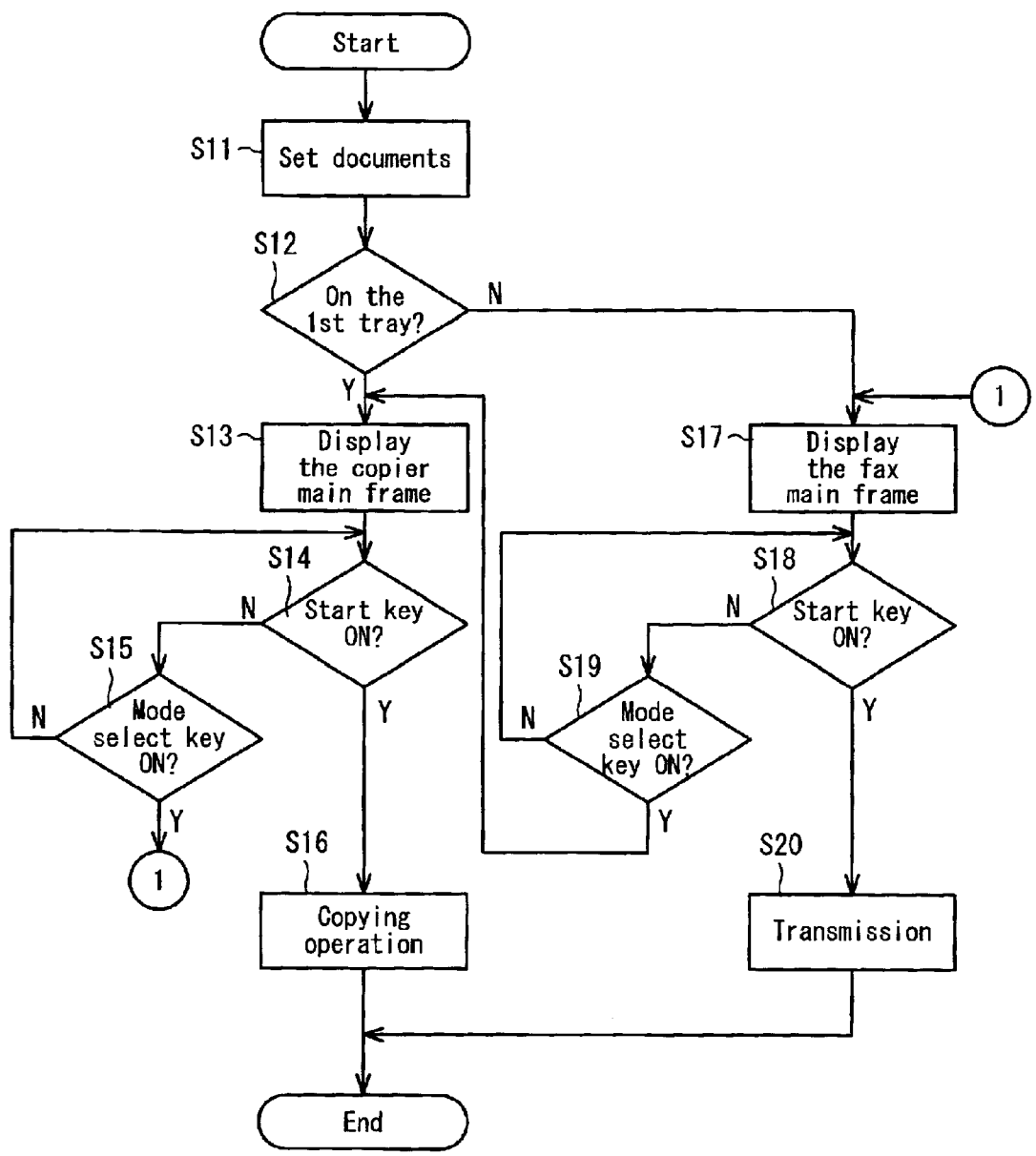
FIG. 8 is a flowchart for illustrating temporal set mode change in an image forming apparatus according to the embodiment of the present invention.

Illustratively, as shown in the flowchart of FIG. 8, documents are set first at S11. It is judged at S12 whether the tray on which the a document or documents are set is the first tray T1. If it is, the copier main display frame CMD is displayed on touch panel TP (FIG. 3) at S13. At S14, it is checked if start key SK has been turned on. If start key SK was turned on, the copying operation is directly performed at S16. If start key SK has not been turned on, it is checked at S15 whether the mode select key (PK, FK or CK) has been turned on. If no mode select key (PK, FK or CK) has been turned on, the operation returns to S14. If the mode select key has been turned on, the mode designated for the first document tray should be changed from the copier mode to the facsimile mode, so the operation jumps to S17 and the facsimile main display frame FMD is displayed.

When it has been judged that the tray is not the first tray T1 but is the second tray T2, the facsimile main display frame FMD is displayed on touch panel TP at S17. At S18, it is checked if start key SK has been turned on. If start key SK was turned on, the facsimile transmission is directly performed at S20. If the start key has not been turned on, it is checked at S19 whether the mode select key (PK, FK or CK) has been turned on. If no mode select key (PK, FK or CK) has been turned on, the operation returns to S18. If the mode select key has been turned on, the mode designated for the second document tray T2 should be changed from the facsimile mode to the copier mode, so the operation jumps to S13 and the copier main display frame FMD is displayed.

In this way, the present embodiment has a multiple number of document trays which are provided so that placement of a document or documents on each tray makes it possible to read the documents in the predetermined mode (usage). However, there is a concern that unstability may occur if, with a document or documents placed on the first document tray T1, the display on touch panel PT changed to that for the copier mode, and another document was set on the second document tray T2 and hence the display on the touch panel TP changed during inputting the instructions of the copying operation.

To deal with such a situation, the controller CU performs control so that the operational conditions (e.g., the content displayed on touch panel TP) on the control panel CP will be kept until the operation under the operational conditions in accordance with the set conditions for the dedicated tray to which a document or documents were set first is completed.

Figure 9:
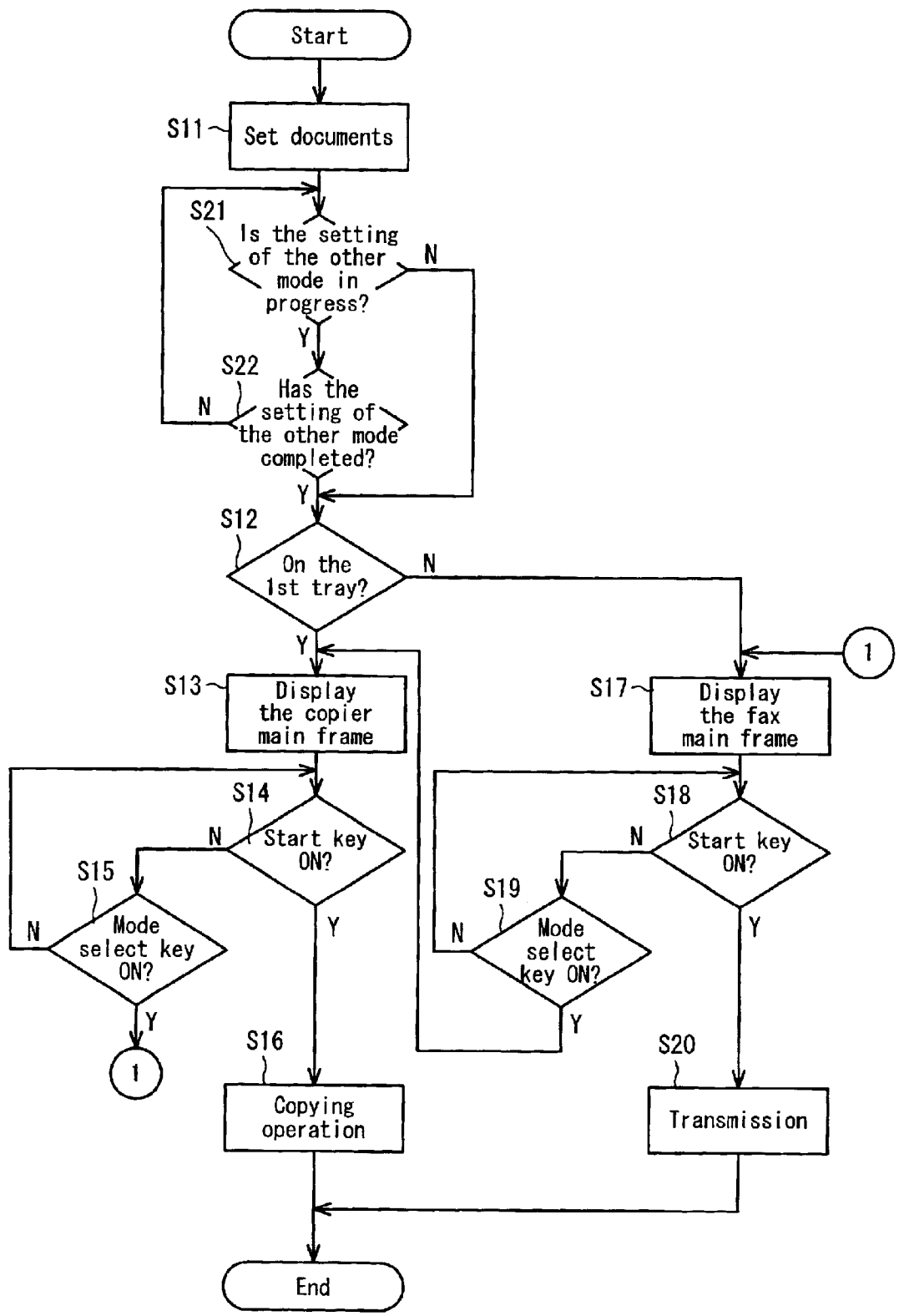
FIG. 9 is a flowchart for illustrating a case where documents are set on two or more dedicated trays in an image forming apparatus according to the embodiment of the present invention.

Specifically, as shown in the flowchart of FIG. 9, the same is done to S11 where a document or documents are set. Then, at S21, it is judged whether or not another mode is being set. For example, suppose that when a document or documents have been placed on the first document tray T1 and various operating conditions (such as copy count, enlargement/reduction magnification ratio, etc.) for a copying operation has been set, a document or documents are placed on the second document tray T2. In this case, if the display on touch panel TP changes into the facsimile main display frame FMD immediately after a document is placed on the second tray T2, the condition setup in the copier mode will be interrupted. To avoid this, it is judged at S21 whether or not setting in the copier mode is in progress. If the judgement at S21 is negative, the operation goes to S12, and followed by the same sequence as effected in FIG. 8. If the judgment at S21 is affirmative, the operation goes to S22, where it is judged whether the setting for the other (copier) mode has been completed.

The criterion on which the judgement as to completion of the setting of this other mode is based is not particularly limited. As explained with FIG. 8, the actuation of start key SK for commanding the execution of a copier or facsimile operation may be used as the criterion. It is also possible to determine that the setting may be regarded as having been completed if no key input has been made for a certain period based on the timer. Alternatively, since the control is often made in a question and answer manner in the case of control through touch panel TP, it is possible to regard the setting as having been completed when a certain question has been cleared in the operational sequence. If the setting in the other mode has been completed, the operation goes to S12 and otherwise returns to S21.

In the above configuration where the display will not be switched as described above until the setting of operational conditions for the mode allotted for the tray on which a document or documents have been put first is completed, it is preferred that the display should be switched immediately after the operational condition setting is determined to have been completed. This control allows for quick setting of the operational conditions for the mode allotted for the tray on which a document or documents have been put subsequently.

In this case, the actuation of the aforementioned start key or the event of actual starting of a copying operation or a facsimile operation may be used as the criterion based on which the display is switched. As in this embodiment where there are only two document trays, when it has been confirmed that the setting of the other mode is in operation, the tray on which a document or documents are placed is determined. Therefore, the operation may directly jump to S13 or S17 by skipping S12.

In the image forming apparatus having the image reading device of the above embodiment, the set conditions (usage purpose/mode) for the first and second document trays T1 and T2 need not be determined at start of usage. Instead of designating the mode for each of the dedicated trays at start of usage, the aforementioned controller CU can be used to manage the usage status of in what mode the first and second document trays T1, T2 and so on have been used for a period of time (e.g., some weeks or some months) so that based on the management of the usage status, the optimal usage purpose or operating condition can be analyzed and determined for each of the document trays. This is preferably displayed on the touch panel, for example.

Figure 11:
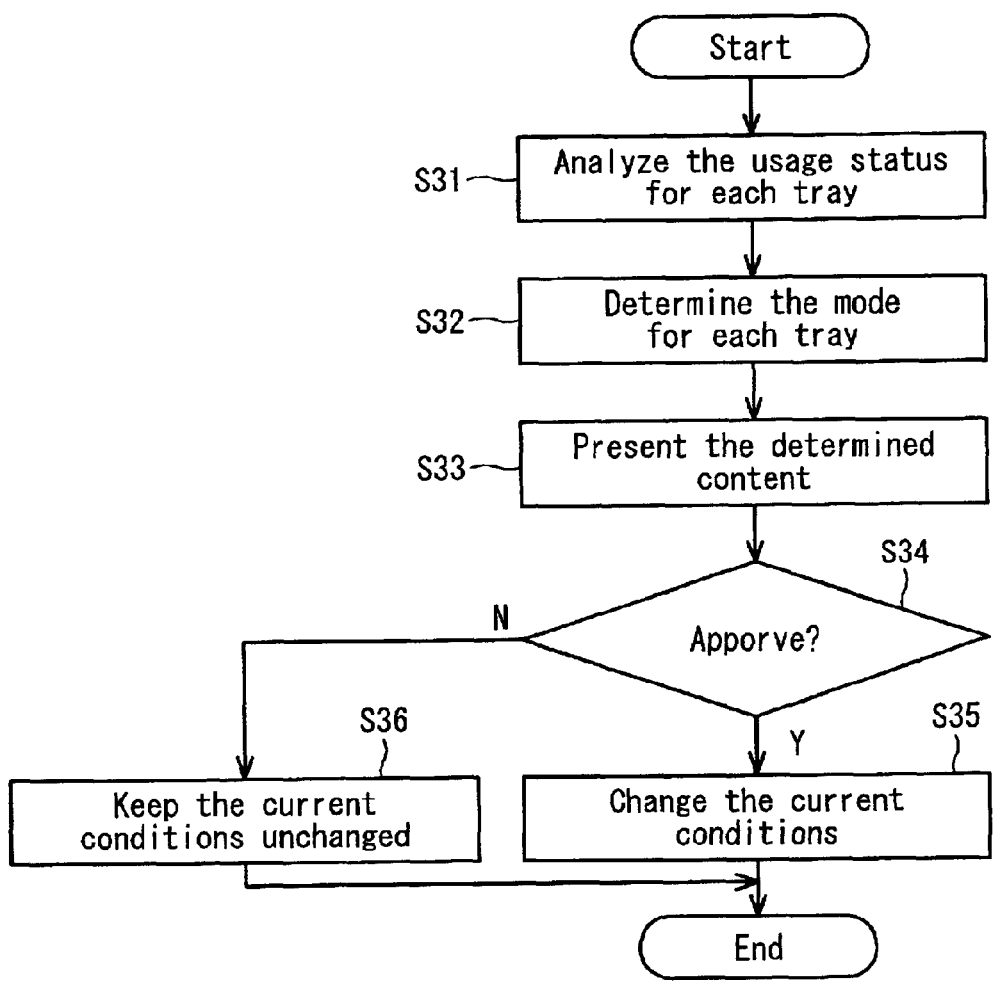
FIG. 11 is a flowchart for illustrating how the dedicated trays are automatically selected in an image forming apparatus according to the embodiment of the present invention.

For example, as shown in FIG. 10, a management table CT2 can be used to manage the usage status of the first and second document trays T1 and T2. Then, the usage status of each tray is analyzed, at S31 as shown in FIG. 11. Next, at S32, the mode for each tray is determined. As an example of allotting the modes, the most easily handled tray among multiple trays can be set for the most frequently used mode. Specifically, suppose that of the first and second document trays, the upper or first document tray T1 is easy to use and this first document tray T1 has been set for copier mode. If the apparatus is used more frequently in the facsimile mode than the copier mode, it is preferred that the mode to be allotted to the first document tray T1 is the facsimile mode. Therefore, the modes are determined so that the first document tray T1 is set for the facsimile mode and the second document tray T2 is set for the copier mode.

Then, at S33, the determined content is displayed (guided) as a message on control panel CP. At S34, it is judged whether or not the user approves the determined conditions. If the user determines that the status should not be changed, 'No' is selected and the operation goes to S36 so as to keep the current setting as is. When the user gives their approval to the setting change according to the recommended, determined content, the operation goes to S35 so as to change the current conditions into the guided conditions.

Figure 12:
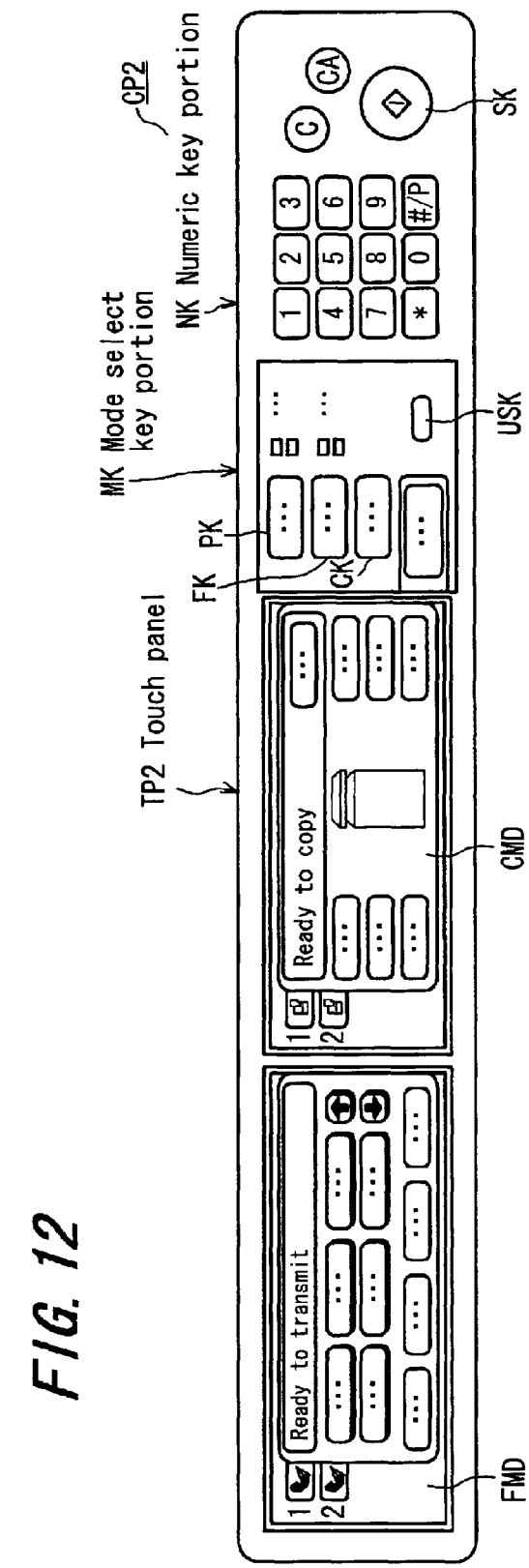
FIG. 12 is a front view showing another control panel according to the embodiment of the present invention.

Though the above embodiment described heretofore, as shown in FIG. 3, includes only a single control panel CP, the present invention should not be limited to this. For example, as shown in FIG. 12, a control panel CP2 may have both of two main display frames FMD and DMD, one for the facsimile mode and the other for the copier mode so that one of them becomes operable (can be displayed, for example) in accordance with the mode designated for the tray on which documents have been placed. In this case, since the modes to be handled by the image reading device can be displayed and since only the placement of documents on one of the trays makes it possible to display the display content of the control panel corresponding to the processing mode previously determined for that dedicated tray, it becomes easy for the user to grasp the setup mode and the display content. The automatic control of the operable conditions for the control panel CP in accordance with the setup conditions of the dedicated tray can be changed by the aforementioned controller as appropriate, depending upon the system configuration.

As has been described, according the present invention, placing documents to be read on one or more document trays enables the documents to be read in the predetermined usage mode or modes, thus making it possible to further improve the operativity of the document reading operation.

What is claimed is:

1. An image reading device which allows the read image information from a document to be used for multiple usage purposes, comprising:

an image reading portion for reading image information from the document;

a document feeder portion for feeding and conveying the document to the image reading portion;

a multiple number of document trays for feeding documents to the document feeder portion;

a control portion through which each of the multiple number of document trays can be designated to be used as a dedicated tray corresponding to the usage purpose and which can provide the presentation of operational conditions corresponding to the usage purpose; and a controller which, when the document is placed on one of the dedicated trays, automatically selects among the multiple sets of operational conditions, one set of operational conditions for the usage purpose designated for the document-placed, dedicated tray and presents said one set of operational conditions on the control portion;

wherein the control portion has a usage purpose selector for allowing a dedicated tray to be temporarily used for a usage purpose other than that designated even after when the document has been placed on the dedicated tray.

2. The image reading device according to claim 1, wherein the control portion includes a display portion and the presentation of the operational conditions is displayed on the display portion.

3. The image reading device according to claim 1 or 2, wherein the control portion comprises a condition setting portion, through which the multiple document trays are allotted to individual dedicated trays each corresponding to a different usage purpose.

4. The image reading device according to claim 1 or 2, wherein setup of the dedicated trays or designation of the usage purposes to the multiple document trays is made by the controller managing and analyzing the usage purposes of pieces of image information which have been read over a certain period of time.

5. The image reading device according to claim 1 or 2, wherein, when documents are placed on multiple dedicated trays, the controller keeps the presentation of the operating conditions for a first dedicated tray on which the document was placed first unchanged until input of the operational conditions for the first dedicated tray for that tray is completed.

6. The image reading device according to claim 1 or 2, wherein, when documents are placed on multiple dedicated trays, after the document reading operation for a first dedicated tray on which documents were placed starts, the presentation of the operating conditions for a second dedicated tray on which the document was placed subsequently is given.

7. The image reading device according to claim 1 or 2, wherein, when no document is placed on any of dedicated trays, multiple sets of operational conditions are displayed in the control portion and when the document is placed on the dedicated tray, the controller automatically presents one set of the operating conditions for the usage purpose of the document-placed, dedicated tray.

8. The image reading device according to claim 1 or 2, wherein the usage purposes of image information at least include: image formation usage on a recording medium and transmission usage.

9. An image forming apparatus comprising an image reading device according to claim 1 or 2.

10. An image forming apparatus which allows the read image information from a document to be used for multiple usage purposes, comprising:

an image forming portion for forming image on recording media in accordance with the image information;

a transmitter for transmitting the image information;

an image reading portion for reading image information from the document;

a document feeder portion for feeding and conveying the document to the image reading portion;

a multiple number of document trays for feeding documents to the document feeder portion;

a control portion through which each of the multiple number of document trays can be designated to be used as the dedicated tray for image formation or the dedicated tray for transmission and which can provide the presentation of the operational conditions for image formation and the presentation of the operational conditions of transmission; and a controller which, when the document is placed on one of the dedicated trays, automatically selects from sets of operational conditions for image formation and transmission, one set of the operational conditions corresponding to the document-placed, dedicated tray and presents said set of operational conditions on the control portion;

wherein the control portion has a usage purpose selector for allowing a dedicated tray to be temporarily used for a usage purpose other than that designated even after when the document has been placed on the dedicated tray.

* * * * *